United States Patent [19]
Morris

[11] 3,983,472
[45] Sept. 28, 1976

[54] CHOKELESS SCHMITT-TRIGGER REGULATOR

[75] Inventor: David Morris, Brooklyn, N.Y.

[73] Assignee: Litton Business Systems, Inc., Morris Plains, N.J.

[22] Filed: Mar. 11, 1974

[21] Appl. No.: 449,688

[52] U.S. Cl.................................. 323/17; 321/2; 321/18; 323/25; 323/DIG. 1
[51] Int. Cl.².................................. H02M 3/335
[58] Field of Search........... 321/2, 18; 323/17, 22 T, 323/23, 25, DIG. 1

[56] References Cited
UNITED STATES PATENTS

| | | | |
|---|---|---|---|
| 3,560,833 | 2/1971 | Oishi et al.............................. 321/2 |
| 3,702,434 | 11/1972 | Ryan.................................... 321/2 X |
| 3,736,480 | 5/1973 | Lee...................................... 321/2 X |
| 3,754,182 | 8/1973 | Morris et al........................... 323/17 |

FOREIGN PATENTS OR APPLICATIONS 1,188,117   5/1970   United Kingdom..................... 321/2

Primary Examiner—A. D. Pellinen
Attorney, Agent, or Firm—Stephen A. Roen; Norman Friedman; Robert F. Rotella

[57] ABSTRACT

A switching regulator is series connected to an oscillator. A schmitt trigger responds to load voltage variations to control the on-off conditions of the switching regulator. When the switching regulator is on the oscillator is on to provide through transformer coupling an output to a capacitor connected across the load. When the voltage across the capacitor increases to a predetermined value the schmitt trigger turns the switching regulator off and thereby the oscillator too, the capacitor continuing to discharge into the load.

5 Claims, 4 Drawing Figures

CHOKELESS SCHMITT-TRIGGER REGULATOR

BACKGROUND OF THE INVENTION

Voltage regulators of the switching type have been developed but these have various shortcomings which affect their usefulness. These devices usually employ a circuit such as a Schmitt trigger which is utilized to detect the variation in the output potential and in turn control an electronic switch which selectively interconnect an unregulated direct potential source with a "flyback" energy circuit. This flyback energy circuit comprises a choke across which is connected a diode and storage capacitor. During a power cycle current will be provided to a load through this diode via the choke and when the inductive energy of the choke decreases below a certain value the storage capacitor will then take over and start to discharge through the load. However, it is relatively costly to use a flyback energy circuit and its use adds to the complexity of such switching regulators. Furthermore, such a choke generates radio frequency interference or "spikes" thereby requiring relatively costly transistor components.

SUMMARY OF THE INVENTION

It is, therefore, an object of this invention to provide an improved switching voltage regulator circuit which does not require a flyback energy circuit.

Another object of this invention is to provide an improved switching voltage regulator circuit having good regulation characteristics but which is less costly than those that utilize a flyback energy circuit.

A further object of this invention is to provide an improved switching voltage regulator circuit which achieves economies of cost.

A still further object of this invention is to provide an improved switching voltage regulator circuit which is less complex and which does not generate radio frequency interference during its operation.

These and other objects of the present invention are accomplished in the illustrative embodiment by providing a Schmitt trigger regulator circuit which is fed by a battery supply voltage. The regulator circuit comprises a series switching transistor controlled by a Schmitt trigger circuit having a first and second triggering stage which is in turn controlled by an output voltage detector. The output voltage detector is coupled to and provides a control signal to the second triggering stage. The output of the regulator is coupled to an oscillator which when energized has its output rectified and integrated by a storage capacitor across a load; this output voltage, the voltage generated across the capacitor, is fed back to the output voltage detector. As the output voltage increases to a certain maximum value the second triggering stage is turned ON. This causes the first triggering stage to switch OFF thereby terminating the power stroke and turning the oscillator OFF. When the output voltage decreases to a certain minimum value it is now insufficient to maintain the second triggering stage ON; thus it is truned OFF. This in turn triggers the first triggering stage to its ON condition and initiates the power stroke thereby activating the oscillator. When the output voltage increases again to said maximum value the second triggering stage returns to its ON condition thereby triggering the first stage OFF to terminate the power stroke.

DESCRIPTION OF THE INVENTION

Figure 1:
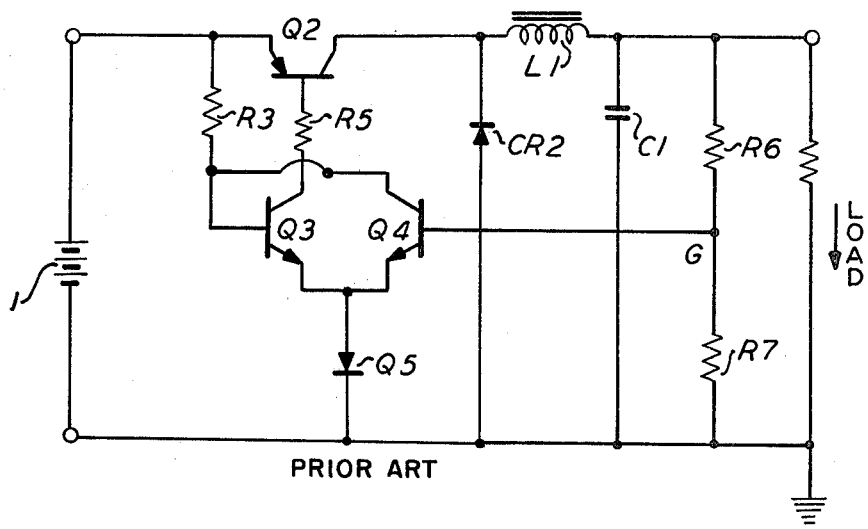
FIG. 1 is a schematic diagram of a conventional Schmitt trigger regulator.
Figure 2:
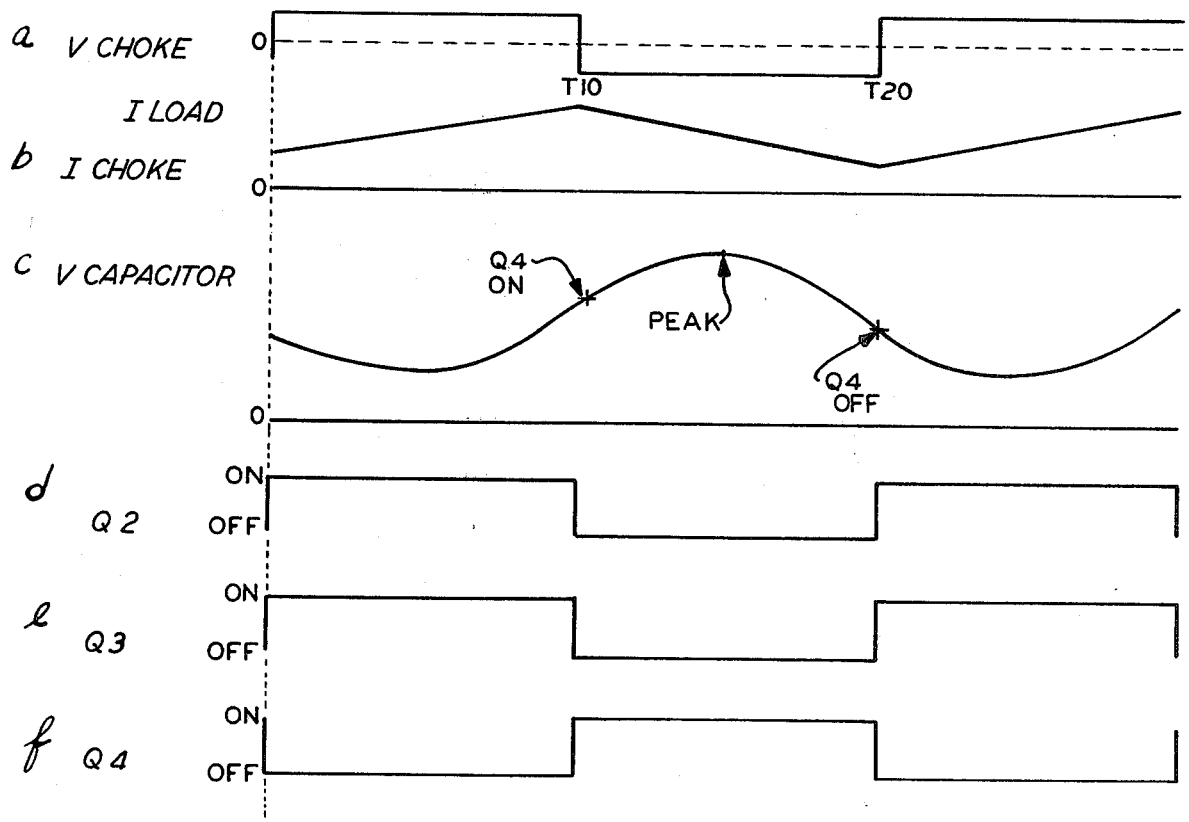
FIG. 2 is a series of waveforms useful in understanding the operation of the circuit of FIG. 1.

To more fully understand and appreciate the invention specific reference is now had to FIGS. 1 and 2 wherein a conventional Schmitt trigger regulator and the waveforms associated therewith are shown. In operation when an input voltage 1 is applied thereto, a first triggering transistor Q3 conducts as a result of the base drive through a bias resistor R3; this transistor Q3 then turns ON a series transistor Q2, the latter allowing current to pass from the input voltage source 1 through an inductive flyback coil L1 to an output load. As the first triggering transistor Q3 conducts, it drives a second triggering transistor Q4 OFF. This action between these two triggering transistors is complementary in this circuit; they are alternately ON and OFF, and at any given time they are always in opposite states of conduction. The current passing through transistor Q2 also charges up a flyback storage capacitor C1. When the output voltage increases so that the voltage across a sensing resistor R7 of the output voltage detector is greater than the sum of the diode voltage of Q5 and the base to emitter voltage of transistor Q4 (i.e. 5.40 volts), at time T10 this second triggering transistor Q4 will conduct thereby bypassing the base drive circuit of the first triggering transistor Q3 to drive transistor Q3 OFF. This will result in series transistor Q2 being turned OFF. As a result of this, flyback inductor L1 will then supply current through a free wheeling diode CR2 to the load and flyback storage capacitor C1. When the inductive energy of L1 decreases to a certain point capacitor C1 will then take over and start to discharge through the load. The output voltage however, will continue to decrease, and as it decreases the base drive through triggering transistor Q4 will also decrease eventually turning it off (i.e. at 5.30 volts) at time T20; such action will turn triggering transistor Q3 ON thereby turning series transistor Q2 back ON and allowing it to again conduct, hence the cycle will repeat. It should be noted that in this conventional circuit the state of the triggering transistors are always opposite to each other and during the time interval that series transistor Q2 is either ON or OFF capacitor C1 both charges and discharges and peaks in the middle of every half-cycle (i.e. at time T15).

Figure 3:
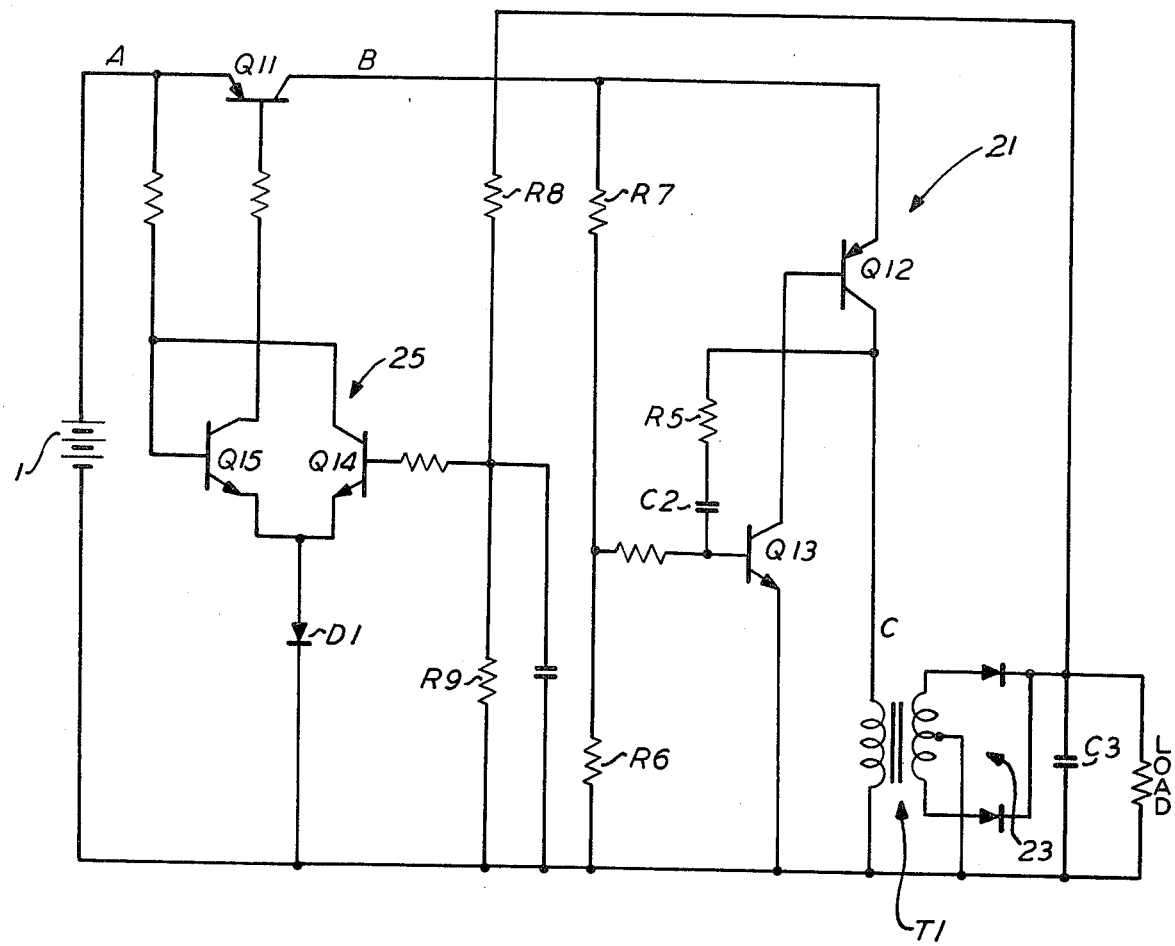
FIG. 3 is a schematic diagram of a circuit incorporating the features of this invention.

Referring now to the detailed schematic illustrated in FIG. 3, the switching voltage regulation portion of this circuit is similar to the circuit illustrated in FIG. 1. However, one of its main differences is in the lack of a "flyback" energy circuit and mode of operation.

A direct current voltage source 1 is coupled over line A to a series switch pass transistor circuit arrangement comprising PNP transistor Q11. The output from the collector of transistor Q11 is coupled over line B to a conventional oscillator circuit 21 comprising transistors Q12 and Q13 and feedback capacitor C2 and resistor R5, and input voltage divider R6 and R7. Oscillator circuit 21 can be conventionally modified to provide low and/or high voltages or several different voltages depending on the load requirements. This oscillator circuit 21 is coupled over line C to the primary of an output transformer T1. The secondary of transformer T1 is coupled through a full wave rectifier circuit 23 to integrating capacitor C3 across which a load is placed. Part of the voltage output developed across capacitor C3 is fedback through voltage divider sensing network R8 and R9 at their junction to the base of an NPN transistor Q14. NPN transistors Q14 and Q15 comprise a conventional Schmitt trigger amplifier circuit 25 and these transistors are alternately ON and OFF, and control the state of series transistor Q11.

Figure 4:
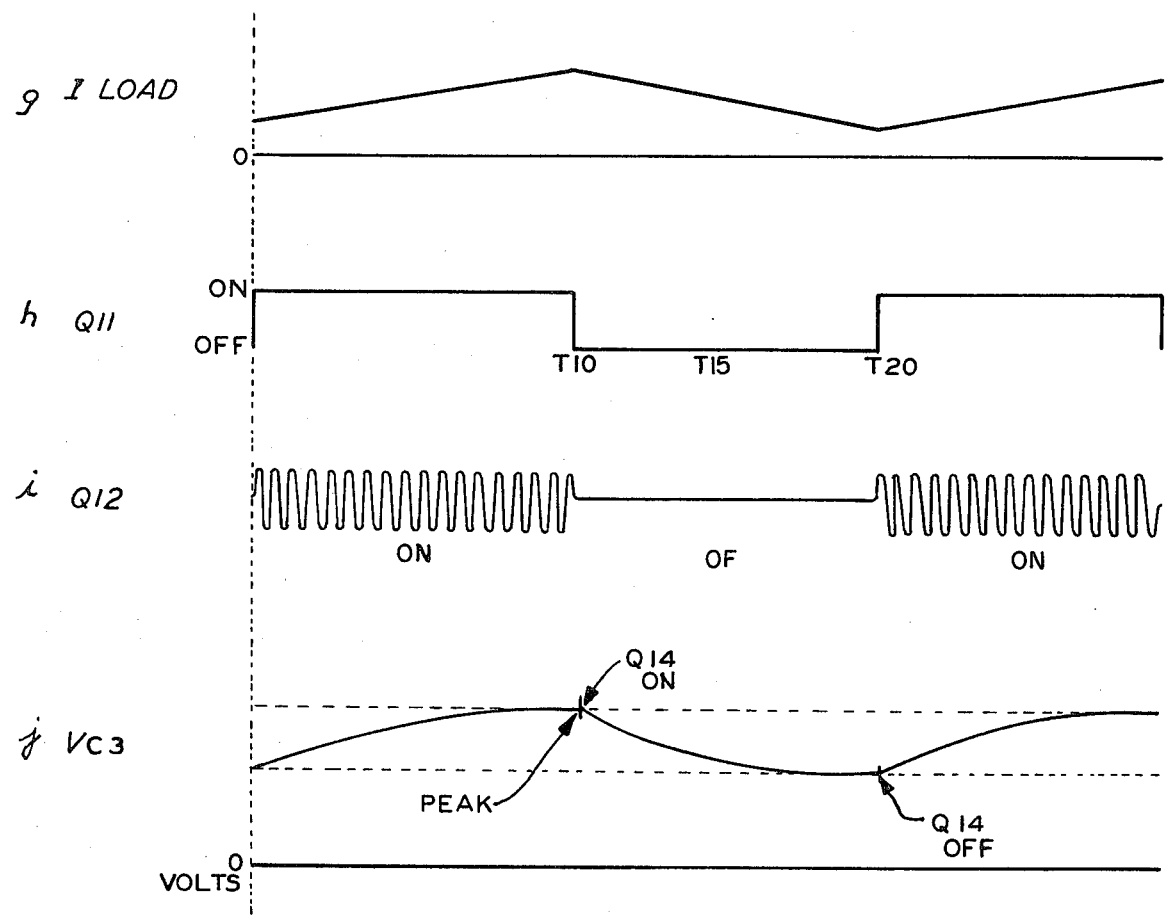
FIG. 4 is a series of wave forms useful in understanding the operation of the circuit of FIG. 3.

Referring now again to the detailed schematic of the circuit illustrated in FIG. 3 and the waveforms illustrated in FIG. 4 and assuming that the output voltage across capacitor C3 has not yet reached a first predetermined maximum but is nevertheless sufficiently high to maintain the switch pass transistor Q11 in the conductive state. During such time current from input voltage source 1 will flow over line A through transistor Q11 to the input of oscillator circuit 21 resistor divider network R6 and R7 thereby activating said oscillator circuit 21. The resulting high frequency output generated by said oscillator is coupled to the primary of transformer T1 and then to the secondary where it is rectified by the full wave rectifier 23. This rectified output charges up storage capacitor C3 and is also fedback to one stage of the schmitt-trigger amplifier 25. When the output voltage developed across C3 charges up and reaches a first predetermined value, its peak value at time T10, a voltage is developed across sensing resistor R9, which when sufficiently positive (i.e. greater than the sum of the diode voltage of D1 and the base to emitter voltage of transistor Q14) will drive transistor Q14 into conduction which results in transistor Q15 of the schmitt trigger amplifier 23 being driven out of conduction and cutting off the base-emitter drive for the series switching pass transistor Q11. When the series switching pass transistor Q11 is cut-off continuous current will be provided to the load via the discharge operation of the storage capacitor C3 but the oscillator 21 will be inoperative due to a lack of proper bias supply voltage. When the capacitive energy of C3 decreases, the output voltage decreases. The series switch pass transistor Q11 will still be maintained cut-off until such time as the output voltage decreases below a certain predetermined amount at time T20, resulting in the biasing of transistor Q14 OFF thereby driving transistor Q15 ON which will in turn provide the series switching transistor Q11 with base-emitter drive. Thus, this transistor Q11 is turned ON initiating another power stroke. FIG. 4 illustrates in detail the waveforms associated with said circuit.

Thus, several significant advantages are achieved by virtue of this invention in comparison with the conventional regulator; these include a switching voltage regulator circuit which does not require a flyback energy circuit and without which does not deleteriously affect its regulation. This switching voltage regulator circuit is therefore less complex and less costly due to the elimination of such flyback energy circuit. Additionally radio frequency interference from the choke of the flyback energy circuit is obviated thereby allowing the use of less costly transistor components. Its mode of operation is significantly different than that of a conventional regulator as can be seen by referring to and comparing the waveform in FIGS. 2 and 4. More specifically, peaking across the load occurs a quarter of a cycle later and only one form of energy charge movement, charging or discharging, occurs when the series pass transistor is ON or OFF.

Obviously many modifications and variations of the present invention are possible in light of the above teachings. It is therefore to be understood that within the scope of the appended claims the invention may be practiced otherwise than specifically described.

What is claimed is:

1. An electrical power supply comprising:
   first coupling means for coupling a direct current input voltage source;
   second coupling means for coupling a regulated voltage to an output load;
   schmitt trigger means having an input terminal, an output terminal, and a control terminal;
   a storage capacitor directly coupled across said output load;
   and non-conduction conditions, comprising a switching regulator means and an oscillator, said switching regulator means having an input terminal coupled to said first coupling means, a control terminal coupled to said output terminal of said schmitt trigger means, and an output terminal coupled to the input of said oscillator, the output of said oscillator coupled to the input of said storage capacitor, a switching amplifier means having conduction for switching said switching amplifier means to either a conduction or non-conduction condition, and for only allowing charging of said storage capacitor during said conduction condition; and
   output voltage detector means having an input terminal coupled to said storage capacitor, and an output terminal coupled to said control terminal of said schmitt trigger means.

2. An electrical power supply according to claim 1 wherein said switching amplifier means also only allows said storage capacitor to discharge during said non-conduction period.

3. An electrical power supply according to claim 2 wherein said switching amplifier means comprises a rectifier circuit means, having an input and output, coupled at its input to the output of said oscillator and coupled at its output to the input of said storage capacitor.

4. An electrical power supply according to claim 2 wherein said switching regulator means comprises a series switching transistor having an input, output and control terminal.

5. An electrical power supply according to claim 4 wherein said schmitt trigger means comprises a schmitt trigger circuit having an output terminal and input terminal, said output terminal connected to said series switching transistor's control terminal.

* * * * *

UNITED STATES PATENT OFFICE
CERTIFICATE OF CORRECTION

PATENT NO. : 3,983,472
DATED : September 28, 1976
INVENTOR(S) : David Morris

It is certified that error appears in the above-identified patent and that said Letters Patent are hereby corrected as shown below:

Column 1, line 62, "truned" should be --turned--.

Column 4, between lines 25 and 26, insert the following phrase --a switching amplifier means having conduction--;

line 34, delete the following "a switching amplifier means having conduction".

Signed and Sealed this

Twenty-fourth Day of May 1977

[SEAL]

Attest:

RUTH C. MASON
Attesting Officer

C. MARSHALL DANN
Commissioner of Patents and Trademarks